Oct. 7, 1958  K. J. GERMESHAUSEN  2,855,544
METHOD OF AND SYSTEM FOR OPERATING GASEOUS-DISCHARGE DEVICES
Filed Feb. 18, 1953
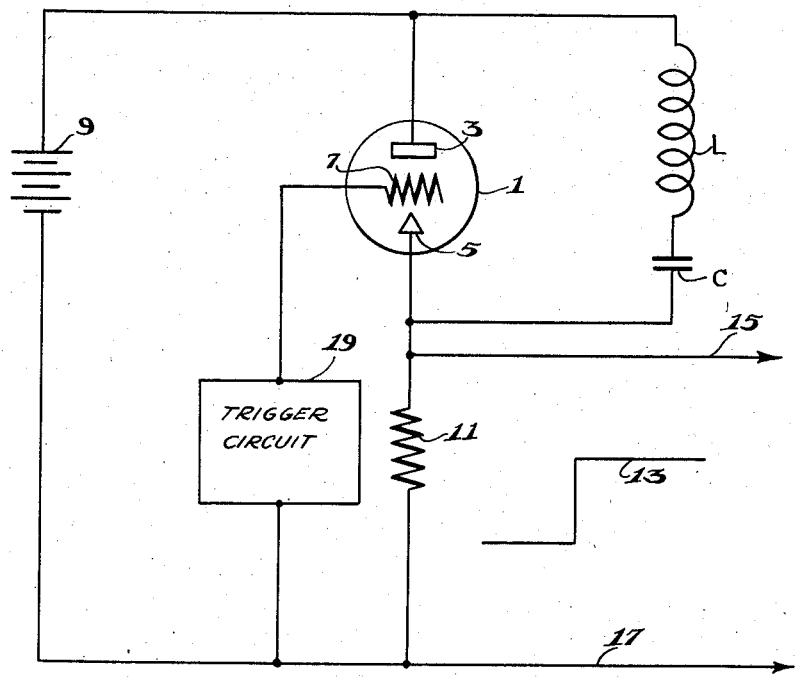
INVENTOR.
KENNETH J. GERMESHAUSEN
BY
*Rines and Rines*
ATTORNEYS

United States Patent Office 2,855,544
Patented Oct. 7, 1958

2,855,544

METHOD OF AND SYSTEM FOR OPERATING GASEOUS-DISCHARGE DEVICES

Kenneth J. Germeshausen, Newton Center, Mass., assignor to Edgerton, Germeshausen & Grier, Inc., Boston, Mass., a corporation of Massachusetts Application February 18, 1953, Serial No. 337,461

12 Claims. (Cl. 315—166)

The present invention relates to methods of and systems for operating gaseous-discharge devices, and more particularly devices of the thyratron type.

Gaseous-discharge devices, such as thyratrons, have heretofore been widely used to deliver sudden energy impulses and the like to a load from a source of voltage connected in circuit with the device. As illustrations, radar transmitters, light-flash photography systems and stroboscopic apparatus, as described, for example, in U. S. Letters Patent 2,478,901, issued August 16, 1949, to Harold E. Edgerton, employ such devices. In most applications of this character, the discharge or load circuit into which the energy impulse is fed under the control of the gaseous-discharge device, is oscillatory. As explained in the said Letters Patent, the discharge or load circuit will itself effect the cutting-off of the gaseous-discharge device a predetermined time after the rendering conductive of the device as a consequence of the reversal of polarity of the voltage impressed upon the device resulting from the tendency of the discharge or load circuit to oscillate. There are instances, however, where the discharge or load circuit inherently can not be oscillatory. In such instances, therefore, the gaseous-discharge device will continue to conduct and to permit the flow of current in the load or discharge circuit unimpeded. Such unimpeded, continuous operation is undesirable and, indeed, can not be tolerated in systems, such as of the above-mentioned types, where it is desired to deliver only short impulses to the load. While the gaseous-discharge device might be rendered non-conductive, in order to cut-off the current in the load circuit, by an interrupter or polarity-reversing switch in the supply voltage connections to the device, this would not insure the cutting-off of the current at a precise, desired predetermined time.

An object of the present invention is to provide a new and improved method of and system for accurately rendering non-conductive at a predetermined time, gaseous-discharge devices of this character operating with discharge or load circuits that are of a non-oscillatory nature. This is accomplished, in accordance with the present invention, with the aid of a supplemental oscillatory circuit for reversing the voltage impressed upon the gaseous-discharge device at the desired moment.

A further object is to provide a new and improved thyratron-controlled discharge system.

Other and further objects will be explained hereinafter and will be more particularly pointed out in the appended claims.

The invention will now be described in connection with the accompanying drawing, the single figure of which is a schematic circuit diagram of the invention in preferred form. A gaseous-discharge device, as of the thyratron type, is shown at 1 provided with an anode 3, a cathode 5 and a control electrode 7. In the output circuit of the thyratron 1 connected between the anode 3 and the cathode 5 is a source of energy, illustrated schematically as a battery 9, and a load 11. In actual practice, the battery 9, of course, may take the form of any well-known source of voltage, such as energy-storage networks including capacitors, as disclosed in the said Letters Patent. The showing of the battery is merely for purposes of illustration and simplicity of explanation.

While the voltage from the source 9 is impressed between the anode 3 and the cathode 5, the thyratron 1 is normally non-conductive so that no energy can normally be delivered to the load 11. When, however, a stimulus, such as a positive voltage impulse, is applied to the control electrode 7 from a trigger circuit or other trigger device 19, the thyratron is rendered conductive and a discharge current flows in the direction from the source 9 through the thyratron 1, between its anode 3 and cathode 5, to produce a voltage impulse 13 across the load 11. The voltage impulse 13 is illustrated as a suddenly upwardly rising step. The trigger circuit or other trigger device 19 may be of any well-known type such as, for example, any of the types disclosed in the said Letters Patent. It may deliver a single triggering stimulus or periodically recurring stimuli, as desired.

Were the discharge or load circuit connected between the anode 3 and the cathode 5 of the thyratron 1 oscillatory in nature, after a predetermined time interval corresponding substantially to the half-period of the oscillation frequency of the discharge circuit, the voltage impressed between the anode 3 and the cathode 5 would tend to reverse its polarity, thus rendering the anode 3 negative with respect to the cathode 5 and cutting-off or rendering non-conductive the thyratron 1. No further energy could then be delivered to the load 11 and the impulse 13 would terminate or fall downward sharply. This would be the desired result in pulse systems of the before-described character.

Without the reversal of voltage, however, the impulse 13 will not terminate since the thyratron will not cease conducting. The voltage impulse 13, on the contrary, will be a continuous applied voltage, though it may not be of constant amplitude depending upon the nature of the source 9 and the associated circuit. This disadvantageous result would, indeed, occur in the circuit illustrated, since this circuit contemplates a cathode load 11 that, in conjunction with the rest of the discharge circuit, renders the discharge or load circuit non-oscillatory. In some cases, indeed, it may be desirable to use a high resistance load 11 to obtain a constant output voltage pulse 13, thereby to reduce the current drawn from the source 9. In order to do this and yet, at the desired moment, to cut-off or render non-conductive the thyratron 1, a supplemental oscillatory circuit is employed in accordance with the present invention. This supplemental circuit comprises a network formed by the series-connected coil L and condenser C connected between the anode 3 and the cathode 5 of the thyratron 1. The sudden flow of current through the thyratron between its anode 3 and cathode 5, upon the rendering conductive of the thyratron in response to the stimulus of the trigger circuit 19, shocks the supplemental LC circuit into oscillation. The inductance of the coil L and the capacitance of the condenser C are adjusted so that the frequency of oscillation thereof is appropriate to reverse the polarity of that portion of the voltage from the source 9 developed across the thyratron 1, between its anode 3 and cathode 5, in a period of time corresponding to the predetermined time after the elapse of which it is desired to render the thyratron 1 non-conductive and thus to terminate the pulse 13. The half-period or time-constant of the LC oscillation frequency will determine substantially this predetermined time. Once the desired time duration of the output pulse 13 is established, the frequency of the LC supplemental circuit must be sufficient to maintain the thyratron 1 conducting for that time duration. The half-period of oscillation of the LC circuit, therefore, may actually be adjusted to a value just greater than the desired pulse duration.

Despite the presence of a high resistance 11 in the discharge or load circuit or the non-oscillatory character of such a circuit, in general, therefore, the thyratron will still deliver a pulse 13 of the desired time duration only, as a result of the action of the supplemental oscillatory LC circuit in accurately cutting off the thyratron 1 at the desired moment after the rendering conductive of the thyratron 1 by the trigger circuit 19. While this supplemental circuit is shown of the preferred series-resonant type, it is to be understood that other types of time-constant or oscillatory networks, including anti-resonant networks, may be employed.

Since the supplemental oscillatory LC circuit automatically renders the thyratron 1 non-conductive at the right time, the present invention is particularly adapted for operation with rapidly and periodically recurring trigger stimuli from the trigger device 19, such as is disclosed, for example, in the said Letters Patent. Each time the thyratron 1 is rendered conductive in response to a trigger stimulus from the trigger circuit 19, a pulse 13 is delivered across the load 11 from the source 19, and the duration of the pulse is automatically limited under the control of the supplemental oscillatory LC circuit. Devices such as the before-mentioned interrupters or polarity-reversing switches in the connections of the supply voltage source 9 to the thyratron 1 would not, of course, be practical for such repetitive operation.

While the invention has been described in connection with the high cathode-load resistor type of discharge or load circuit, this is only for purposes of illustration. There are many other types of non-oscillatory discharge or load circuits with which the present invention may also be employed in precisely the same manner. One such, as another illustration, is where the load comprises cathode-ray-tube deflection means, as for the production of a sweep or an impulse on a cathode-ray-tube screen. Such a deflection circuit must often be critically damped, so that the load circuit, again, is non-oscillatory.

Further modifications will occur to those skilled in the art, and all such are considered to fall within the spirit and scope of the invention as defined in the appended claims.

What is claimed is:

1. In a non-oscillatory electric circuit containing a normally non-conductive gaseous-discharge device, a method of operating the non-oscillatory electric circuit that comprises impressing a voltage in one direction through the gaseous-discharge device in order to render the same conductive, thereby to cause current to flow in the non-oscillatory electric circuit, extracting part of the said current, and reversing the direction of flow of the said extracted part of the said current to reverse the impressed voltage at a predetermined time after the rendering conductive of the gaseous-discharge device in order thereupon to render the same non-conductive.

2. In a non-oscillatory electric circuit containing a normally non-conductive gaseous-discharge device, a method of operating the non-oscillatory electric circuit that comprises impressing a voltage in one direction through the gaseous-discharge device in order to render the same conductive, thereby to cause current to flow in the non-oscillatory electric circuit, extracting part of the said current, and oscillating the said extracted part of the said current to reverse the portion of the impressed voltage developed in the said circuit across the gaseous-discharge device at a predetermined time after the rendering conductive of the gaseous-discharge device corresponding substantially to the half-period of the frequency of the oscillation, thereupon to render the gaseous-discharge non-conductive.

3. An electric system having, in combination, a normally non-conductive gaseous-discharge device, means for rendering the device conductive, a non-oscillatory circuit connected to the device having a source of voltage for causing current to flow therein and through the device upon the device being rendered conductive, means for extracting part of the said current, and means for reversing the direction of flow of the extracted part of the said current to reverse the voltage impressed upon the device a predetermined time after the rendering conductive of the gaseous-discharge device in order thereupon to render the same non-conductive.

4. An electric system having, in combination, a normally non-conductive gaseous-discharge device, means for rendering the device conductive, a non-oscillatory circuit connected to the device having a source of voltage for causing current to flow therein and through the device upon the device being rendered conductive, means for extracting part of the said current and time-constant-controlled means for reversing the direction of flow of the extracted part of the said current to reverse the voltage impressed upon the device a predetermined time after the rendering conductive of the gaseous-discharge device in order thereupon to render the same non-conductive.

5. An electric system having, in combination, a normally non-conductive gaseous-discharge device, means for rendering the device conductive, a non-oscillatory circuit connected to the device having a source of voltage for causing current to flow therein and through the device upon the device being rendered conductive, means for extracting part of the said current, and an electric network having a predetermined time constant and responsive to the rendering conductive of the gaseous-discharge device for reversing the direction of flow of the extracted part of the said current to reverse the voltage impressed upon the device a predetermined time after the rendering conductive of the gaseous-discharge device in order thereupon to render the same non-conductive.

6. An electric system having, in combination, a normally non-conductive gaseous-discharge device, means for rendering the device conductive, a non-oscillatory circuit connected to the device having a source of voltage for causing current to flow therein and through the device upon the device being rendered conductive, means for extracting part of the said current, and an oscillatory electric circuit having a predetermined frequency and responsive to the rendering conductive of the gaseous-discharge device for reversing the direction of flow of the extracted part of the said current to reverse the voltage impressed upon the device a predetermined time after the rendering conductive of the gaseous-discharge device in order thereupon to render the same non-conductive.

7. An electric system having, in combination, a normally non-conductive gaseous-discharge device, means for rendering the device conductive, a non-oscillatory circuit connected to the device having a source of voltage for causing current to flow therein and through the device upon the device being rendered conductive, an electric circuit connected in shunt with the gaseous-discharge device to extract part of the said current, and an oscillatory electric circuit connected in the said shunt electric circuit and having a predetermined frequency for reversing the direction of flow of the extracted part of the said current to reverse the voltage impressed upon the device a predetermined time after the rendering conductive of the gaseous-discharge device in order thereupon to render the same non-conductive.

8. An electric system having, in combination, a normally non-conductive gaseous-discharge device having an anode, a cathode and a control electrode, a non-oscillatory output circuit connected between the cathode and the anode, an input circuit provided with means for applying a stimulus to the control electrode to render the device conductive, and a supplemental circuit connected between the anode and cathode to extract part of the current flowing in the output circuit, the supplemental circuit including an oscillatory circuit that may be set into oscillation by the sudden flow of current through the gaseous-discharge device upon the rendering of the same conductive in order to reverse the direction of flow of the extracted part of the said current, and the supplemental circuit having a frequency of oscillation the half period of which corresponds substantially to a predetermined time after the elapse of which it is desired to render the gaseous-discharge device non-conductive.

9. An electric system having, in combination, a normally non-conductive gaseous-discharge device having an anode, a cathode and a control electrode, an output circuit connected between the cathode and the anode and provided with a load of nature such as to render the output circuit non-oscillatory, an input circuit provided with means for applying a stimulus to the control electrode to render the device conductive, thereby to deliver current to the load, and a supplemental circuit connected between the anode and cathode to extract part of the current flowing in the output circuit, the supplemental circuit including an oscillatory circuit that may be set into oscillation by the sudden flow of current through the gaseous-discharge device upon the rendering of the same conductive in order to reverse the direction of flow of the extracted part of the said current, and the supplemental circuit having a frequency of oscillation the half-period of which corresponds substantially to a predetermined time after the elapse of which it is desired to render the gaseous-discharge device non-conductive.

10. An electric system having, in combination, a normally non-conductive gaseous-discharge device having an anode, a cathode and a control electrode, an output circuit connected between the cathode and the anode comprising a source of voltage and a load of resistance sufficiently high to render the output circuit non-oscillatory, an input circuit provided with trigger means for applying a stimulus to the control electrode to render the device conductive, thereby to deliver current from the source of voltage through the conductive gaseous-discharge device to the load, and a supplemental circuit connected between the anode and cathode to extract part of the current flowing in the output circuit, the supplemental circuit including an oscillatory circuit that may be set into oscillation by the sudden flow of current through the gaseous-discharge device upon the rendering of the same conductive in order to reverse the direction of flow of the extracted part of the said current, and the supplemental circuit having a frequency of oscillation the half-period of which corresponds substantially to a predetermined time after the elapse of which it is desired to render the gaseous-discharge device non-conductive.

11. An electric system having, in combination, a normally non-conductive gaseous-discharge device having an anode, a cathode and a control electrode, an output circuit connected between the cathode and the anode comprising a source of voltage and a load of resistance sufficiently high to render the output circuit non-oscillatory, an input circuit provided with trigger means for applying a stimulus to the control electrode to render the device conductive, thereby to deliver current from the source of voltage through the conductive gaseous-discharge device to the load, and a supplemental circuit connected between the anode and cathode to extract part of the current flowing in the output circuit, the supplemental circuit comprising series-connected inductance and capacitance tuned to be set into oscillation by the sudden flow of current through the gaseous-discharge device upon the rendering of the same conductive in order to reverse the direction of flow of the extracted part of the said current, and the supplemental circuit inductance and capacitance having a frequency of oscillation the half-period of which corresponds substantially to a predetermined time after the elapse of which it is desired to render the gaseous-discharge device non-conductive.

12. An electric system having, in combination, a normally non-conductive gaseous-discharge device having an anode, a cathode and a control electrode, a non-oscillatory output circuit connected between the cathode and the anode, an input circuit provided with means for applying a brief pulse stimulus to the control electrode to render the device conductive, and a supplemental circuit connected between the anode and cathode to extract part of the pulse of current flowing in the output circuit, the supplemental circuit including an oscillatory circuit that may be set into oscillation by the sudden flow of a pulse of current through the gaseous-discharge device upon the rendering of the same conductive in order to reverse the direction of flow of the extracted part of the said pulse of current, and the supplemental circuit having a frequency of oscillation the half period of which corresponds substantially to a predetermined time after the elapse of which it is desired to render the gaseous-discharge device non-conductive, thereby to render the gaseous-discharge device non-conductive in a time determined substantially by the said half-period and not by the time duration of the said pulse stimulus.

References Cited in the file of this patent

UNITED STATES PATENTS

| Number | Name | Date |
|---|---|---|
| 1,793,329 | Langmuir | Feb. 17, 1931 |
| 2,441,325 | Morrison | May 11, 1948 |
| 2,478,907 | Edgerton | Aug. 16, 1949 |
| 2,538,577 | McCarty | Jan. 16, 1951 |
| 2,686,262 | Wiley | Aug. 10, 1954 |